United States Patent [19]
Botelho

[11] Patent Number: 5,477,544
[45] Date of Patent: Dec. 19, 1995

[54] MULTI-PORT TESTER INTERFACE

[75] Inventor: Alvin Botelho, Tiverton, R.I.

[73] Assignee: The United States of America as represented by the Secretary of the Navy, Washington, D.C.

[21] Appl. No.: 194,600

[22] Filed: Feb. 10, 1994

[51] Int. Cl.[6] .................................................. G01R 31/28
[52] U.S. Cl. ...................... 371/20.1; 371/22.1; 395/280; 324/555
[58] Field of Search .................................... 364/481, 550, 364/551.01, 579, 580; 371/22.1, 20.1, 15.1; 395/325; 324/73.1, 555

[56] References Cited

U.S. PATENT DOCUMENTS

| | | | |
|---|---|---|---|
| 3,848,188 | 11/1974 | Ardezzone et al. | 371/27 |
| 3,854,125 | 12/1974 | Ehling et al. | 395/325 |
| 4,736,374 | 4/1988 | Kump et al. | 371/25.1 |
| 4,760,330 | 7/1988 | Lias, Jr. | 371/15.1 |
| 4,810,958 | 3/1989 | Mogi et al. | 364/481 |
| 4,866,714 | 9/1989 | Adams et al. | 371/22.1 |
| 4,896,055 | 1/1990 | Fuji et al. | 324/73.1 |
| 4,926,363 | 5/1990 | Nix | 364/579 |
| 4,985,673 | 1/1991 | Horie | 364/481 |
| 5,130,646 | 7/1992 | Kojima | 371/15.1 |
| 5,182,717 | 1/1993 | Luciani et al. | 364/481 |
| 5,231,345 | 7/1993 | Katakura et al. | 324/73.1 |
| 5,235,273 | 8/1993 | Akar et al. | 371/22.1 |
| 5,337,262 | 8/1994 | Luthi et al. | 324/73.1 |

Primary Examiner—James P. Trammell
Assistant Examiner—Kyle J. Choi
Attorney, Agent, or Firm—Michael J. McGowan; James M. Kasischke; Prithvi C. Lall

[57] ABSTRACT

A multi-port tester interface is coupled between an interface port tester having only one test port and a plurality of interface ports to be tested. The multi-port tester interface includes timing and control logic which provides an initialization signal to the interface port tester. The timing and control logic controls an interface port selector to provide an interface port address to a test signal multiplexer and an input multiplexer. A test signal from the interface port tester is transmitted to the appropriate interface port under test through the test signal multiplexer. A successful test completion signal is received by the appropriate input of the test completion multiplexer as selected by the address provided by the interface port selector, and provided to an input port of the interface port tester. Each interface port to be tested is thus sequentially yet automatically coupled to the interface port tester, and is sequentially tested without connecting and disconnecting individual interface ports from a tester. Appropriate reset and voltage level signal shifting circuitry is also provided.

6 Claims, 3 Drawing Sheets

MULTI-PORT TESTER INTERFACE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to testers for multiple interface ports and more particularly, to a multi-port interface between an interface port tester and a plurality of simultaneously connected interface ports.

2. Description of the Prior Art

There are many instances during the testing phase of electronic systems wherein interface ports must be tested both for the mechanical connection between an interface cable and an interface port, as well as of the interface port logic or circuitry itself.

Often times a unit under test such as a control panel or interface includes a large number of interface ports. It is not uncommon, for example, for a unit under test to include eight or more interface ports. The prior art method of testing such ports requires that the individual performing the test connect a test cable to one interface port at a time, initialize a computer to perform the test, then disconnect the cable from the tested interface port and reconnect the cable to a subsequent interface port to be tested.

In addition to the time consuming nature of this method, much manpower and time are wasted in both connecting and disconnecting the interface cables from the interface ports to be tested. Moreover, due to the tremendous amount of time expended in connecting and disconnecting the cables, a given interface port is typically tested only once. Oftentimes, the testing of an interface port only once does not give a true indication of the true reliability of the interface port.

Accordingly, what is needed is a multi-port tester interface which can simultaneously connect one port of a tester with ports on a plurality of units under test, and which can automatically select a port to be tested and initialize the port tester to begin testing the selected interface port, while subsequently moving on to other sequentially selected interface ports.

SUMMARY OF THE INVENTION

The present invention features a multi-port tester interface which serves as an interface between an interface port tester having only one input and output port, and a plurality of interface ports to be tested on at least one unit under test. The interface port tester is responsive to at least one initialization signal, for providing at least one interface port test signal to the interface ports under test. The interface port tester also includes one interface port successful test signal path, for receiving an interface port successful test completion signal from an interface port under test.

In the preferred embodiment, the multi-port tester interface is coupled to a plurality of units under test each including an at least one interface port, each interface port including at least one interface port test signal receiver and at least one successful test completion signal transmitter. In the preferred embodiment, each interface port to be tested can also include logic circuitry which is coupled to and tested by the received at least one interface port test signal.

Additionally, each interface port to be tested includes an interface port successful test completion signal transmitter, for transmitting back to the interface port tester in indication of successful completion of the interface port test.

The multi-port tester interface of the present invention includes a first interface port which is coupled to the interface port tester, for receiving the interface port test signal from the interface port tester, and for providing the interface port successful test completion signal and the interface port tester initialization signal to the interface port tester.

The multi-port tester interface also includes a plurality of unit under test ports by which a corresponding plurality of interface ports on the units under test can be coupled.

The multi-port tester interface of the present invention is thus coupled between the interface port tester and the units under test. The multi-port tester interface includes timing and control logic, which generates at least one initialization signal to the interface port tester, and which generates at least one multi-port tester interface control signal, for controlling the sequential operation and timing of the multi-port tester interface.

The multi-port tester interface of the present invention also includes an interface port selector, responsive to the multi-port tester interface control signal, for generating at least one interface port selector signal, for selecting one of the plurality of interface ports to be tested.

Responsive to the interface ports selector signal is an interface port test signal multiplexer, which provides the interface port test signal from the interface port tester to the selected interface port to be tested. Also included in the present invention is an interface port successful test completion signal multiplexer, coupled to each of the successful test completion transmitters of each of the plurality of interface ports to be tested and to the one successful test completion path of the interface port tester. The successful test completion signal multiplexer is also responsive to the multi-port tester interface control signal, for providing the interface port successful test completion signal from the selected one of the plurality of interface ports presently under test to the one input port of the interface port tester.

In the preferred embodiment, the interface port tester of the present system includes a computer having at least a display and keyboard. In this embodiment, the computer provides an indication on the display of a received interface port successful test signal. Further, this embodiment includes a multi-port tester interface which provides a plurality of initialization signals, each of which can be coupled to one key of the computer keyboard, for simulating the depression of one of the keys and causing the beginning or initialization of the interface port test sequence for a selected interface port.

The multi-port tester interface of the present invention can further include an interface port address display means, which is responsive to a plurality of address signals provided by the interface port selector, for displaying an indication of the interface port currently under test. Also included can be a test signal display means as well as a successful test completion signal display means, for displaying an indication of test signals transmitted from the interface port tester to the interface port under test, and for displaying an indication of a received successful test completion signal transmitted by the interface port under test to the interface port tester.

Additionally, one or both of the interface port test signal multiplexer and the interface port successful test completion signal multiplexer may include a signal level shifter, for shifting the voltage level of the signals provided from the multi-port tester interface to the interface port under test, and from the interface port under test to the multi-port test interface of the present invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DESCRIPTION OF THE PREFERRED EMBODIMENT

Figure 1:
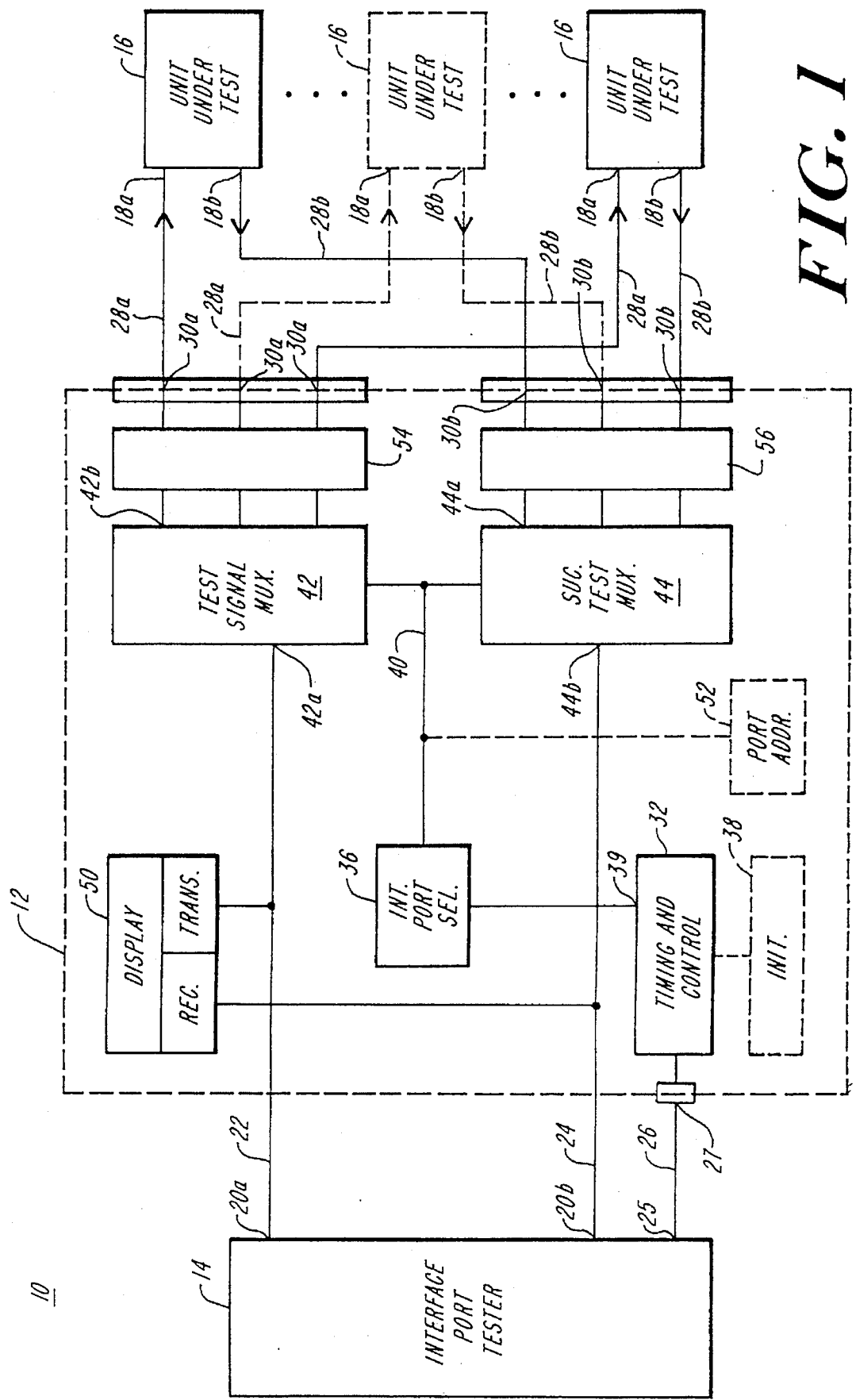
FIG. 1 is a block diagram illustrating the multi-port tester interface of the present invention.

A complete interface port test system 10, FIG. 1, includes a multi-port tester interface 12 of the present invention coupled between an interface port tester 14 and a plurality of units under test 16, each having at least one test signal input port 18a and at least one successful test completion output port 18b.

Interface port tester 14 includes an interface port test signal output port 20a and a successful test completion input port 20b. In FIG. 1 these ports 20a and 20b are shown as separate ports but it is recognized that a single RS-232 interface port can be configured to provide both functions. Interface port test signal output port 20a transmits an interface test port signal over an interface test port signal path 22 to multi-port tester interface 12. Successful test completion input port 20b also receives an interface port successful test completion signal over the interface port successful test completion signal path 24 from the multi-port tester interface 12.

Additionally, the interface port tester 14 receives one or more initialization signals at initialization input port 25 over initialization signal path 26. The initialization signals are provided by the multi-port tester interface 12 and serve to control the initialization or beginning of interface port testing by the interface port tester 14.

The multi-port tester interface 12 of the present invention facilitates testing of one or more units under test 16 each having interface ports such as test signal input port 18a and successful test completion output port 18b. In the preferred embodiment, it is contemplated that interface 12 can be coupled to eight or sixteen units under test 16. Each unit under test 16 typically includes logic or circuitry which receives and transmits signals between interface ports 18a, 18b and the unit under test 16.

Each unit under test 16 is simultaneously coupled by means of interface cables 28a, 28b to a corresponding unit under test of interface port 30a and a test completion input port 30b of multi-port tester interface 12. As in the connection between multi-port tester interface 12 and interface port tester 14, the interface ports 18a, 18b in unit under test 16 and the ports of the multi-port tester interface of the present invention can be RS-232 interface ports or other various interface ports and interface port protocols.

The multi-port tester interface 12 according to the present invention includes timing and control logic 32 which controls the initialization of interface port tester 14 and interface port selector 36 as will be described in greater detail below. An initialization control signal is provided over signal path 26 to an initialization output port 27 joined to the initialization input port 25. In the preferred embodiment, timing and control logic 32 is responsive to an initialization signal from an initialization device 38 such as a reset switch. Alternatively, the initialization device 38 can be coupled to other appropriate devices such as interface port selector 36, such a feature being merely a design choice and alternatives for which are considered to be within the scope of the present invention.

Upon being initialized, timing and control logic 32 provides both the initialization signal and the interface port selector control signal generally simultaneously with one another. The interface port selector 36 input is joined to timing and control signal output 39 to cause interface port selector 36 to increment, typically by one, an interface port address provided by an interface selector signal output over interface port address bus 40 to an interface port test signal multiplexer 42 and an interface port successful test completion signal multiplexer 44.

Thus, upon initialization, interface port selector 36 will assert or provide address zero signals over interface port address bus 40 to test signal multiplexer 42 and test signal completion signal multiplexer 44. Since the interface port tester 14 is generally simultaneously provided with an initialization signal, interface port tester 14 begins the interface port test sequence by providing one or more interface port test signals over signal path 22 to a test signal input 42a on test signal multiplexer 42.

Test signal multiplexer 42 also has a plurality of test signal outputs 42b. Since the output multiplexer 42 has received an address of "zero" from the interface port selector 36, all data provided by the interface port tester 14 over the interface port test signal path 22 will be directed to the port "zero" test signal output 42b of the test signal multiplexer 42. Since the port "zero" test signal output 42b of test signal multiplexer 42 is connected to port 30a of multi-port tester interface 12, test data travels via cable 28a to port 18a of unit under test 16.

Port 18a of unit under test 16 typically includes interface logic which receives the test signal, responds to the test signal by performing appropriate testing of the interface port, and returns a successful test completion signal. Successful test completion signal multiplexer 44 has a plurality of successful test completion inputs 44a and a successful test completion signal output 44b. A successful test completion signal is received from port 18b of unit under test 16 and travels over cable 28b to interface port 30b of multi-port tester interface 12. The successful test completion signal received at interface port 30b is directed to port "zero" successful test completion input 44a of the input multiplexer 44. Since port "zero" input 44a of the successful test completion signal multiplexer 44 is selected due to address zero asserted over the interface port address bus 40, the successful test completion signal is routed over data path 24 to interface port 20b of the interface port tester 14.

In the preferred embodiment, interface port tester 14 includes a computer having both a display screen and keyboard and thus, an indication of successful test completion is provided on the display screen of the interface port tester 14. Alternatively, the multi-port tester interface 12 can include a dedicated device which provides a visual or audible indication of successful test completion such as the lighting of an LED or the sounding of a bell or buzzer. Additionally, one embodiment of the multi-port tester interface 12 of the present invention contemplates providing display means 50 which provides a visual indication of both the interface port test signal being transmitted to the test signal input port 18a of the unit under test 16, as well as the receipt of the interface port successful test completion signal received over signal path 24. An additional embodiment also contemplates an interface port address display means 52 which serves to provide a visual display of the interface port address currently under test.

After allowing sufficient time for interface port tester 14 to transmit an interface port test signal and for the successful test completion output port 18b of the unit under test 16 to transmit a successful test completion signal, (typically approximately 4 seconds) timing and control logic 32 provides a second interface port selector control signal which causes the interface port selector 36 to increment the address of the interface port to be tested by one. Thus, both test signal and test completion multiplexers 42, 44 will now receive interface port address "one", which will cause the test signal multiplexer 42 to direct the test data signals to the test signal input port 18a of the unit under test 16 having interface port address "one". Test completion multiplexer 44 will look for an interface port successful test completion signal to be received at input address "one" and will direct the received signal to the interface port tester 14. Such sequencing continues until the final interface port "N" is tested.

As previously stated, the present multi-port tester interface 12 is capable of handling any number of interface ports 18. It is contemplated, however, that sixteen units under test 16 each having one interface port (including input 18a and output 18b) or eight units under test 16 each having two interface ports will be typical. It is evident that within the scope of the present invention, many other combinations of units under test or interface ports are contemplated.

In order to allow the multi-port tester interface 12 of the present invention to interface with a wide variety of interface port types which in turn support various interface port protocols, the multi-port tester port interface 12 of the present invention may also include first and second logic voltage level shifters 54 and 56. Logic voltage level shifters 54, 56 are coupled between test signal and successful test multiplexers 42, 44 and interface ports 30a, 30b of multi-port tester interface 12 respectively. Voltage level shifter 54 serves to shift or change the level of the test signals provided by the test signal multiplexer 42 from the voltage levels of multi-port tester interface 14 (typically plus and minus 5 volts), to the voltage level required by interface ports 18a being tested (such as plus 12 volts and minus 6 volts).

Similarly, voltage level shifter 56 is coupled between each of the interface ports 18b and successful test multiplexer 44, for shifting the voltage level of the signals received from interface port under test 18b, such as the successful test completion signal, from the voltage level of interface port under test 18b to the voltage level acceptable to interface port tester 14.

Figure 2A:
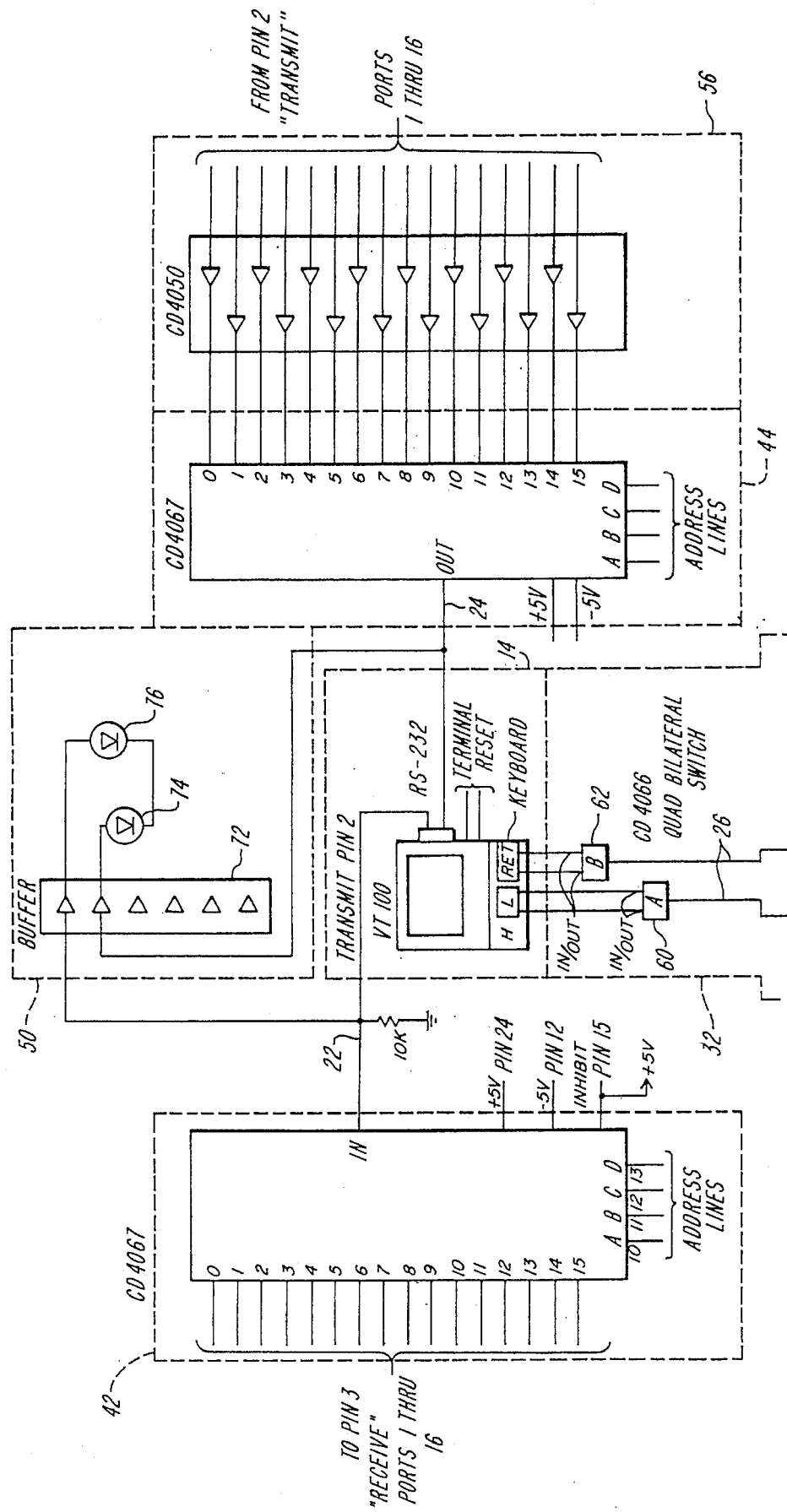
FIGS. 2A and 2B are a schematic of one implementation of one embodiment of the multi-port tester interface of the present invention.
Figure 2B:
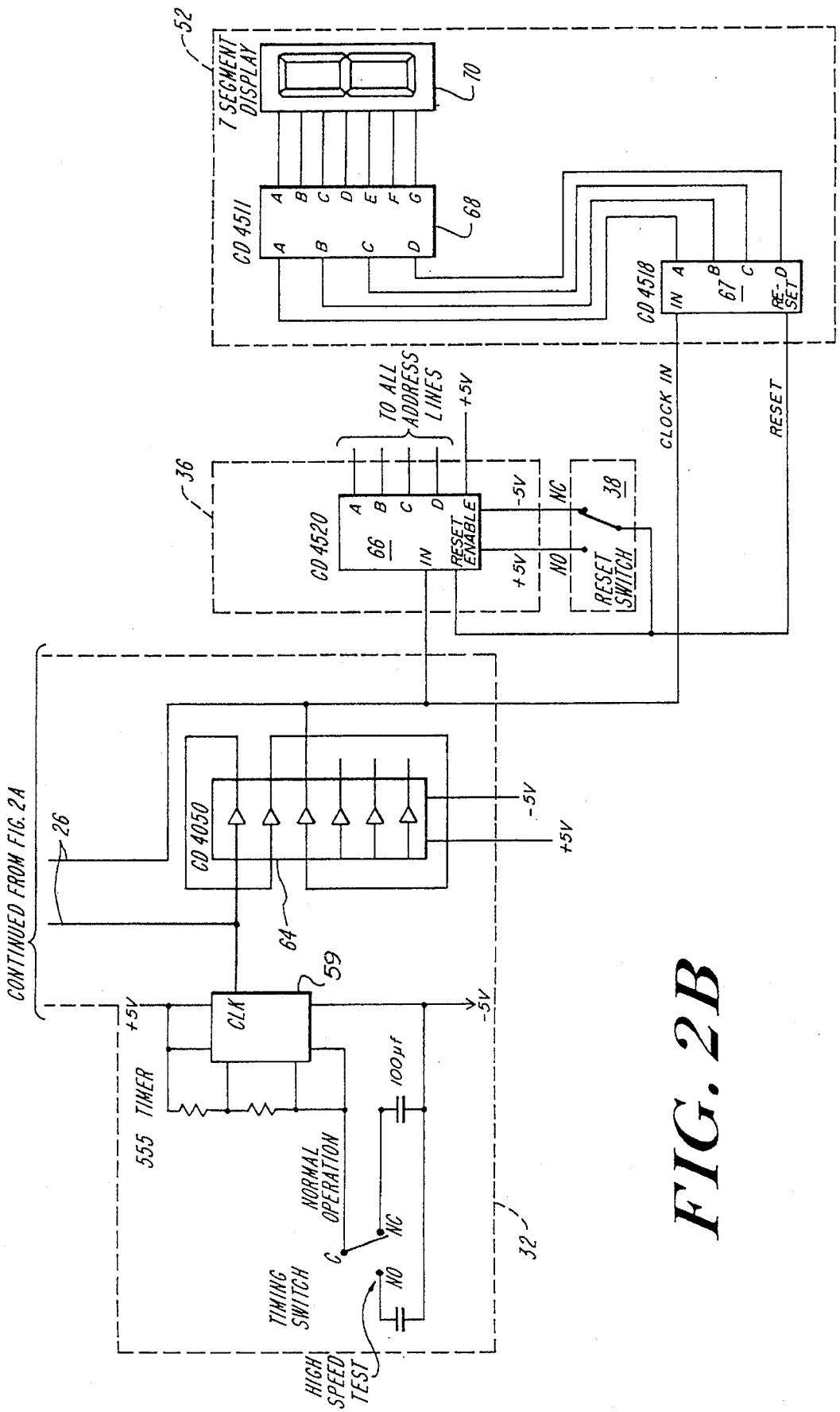

One implementation of one embodiment of an interface port test system embodying the multi-port tester interface of the present invention is illustrated in FIG. 2A and FIG. 2B wherein is shown interface port tester 14 which in this embodiment is a computer or terminal such as a standard VT100 terminal available from Digital Equipment Corporation. The interface port tester 14 is coupled to timing and control circuit 32a which in the present embodiment includes a 555 timer 59 which controls two bilateral switches 60 and 62 which in the exemplary embodiment are RCA CD4066 IC's. The 555 timer 59 is coupled to appropriate resistive and capacitive components to cause the timer 59 to provide one pulse every four seconds during normal operation mode.

The pulse from the 555 timer 59 is provided to switch 60 which is connected across the "L" key of the keyboard of the interface port tester 14. This pulse travels through three buffer delays in an RCA CD4050 delay buffer 64 before going to bilateral switch 62 which is connected across the "Return" key of the interface port tester 14. This will initialize interface port tester 14a. The delayed 555 timer signal also clocks dual binary up-counter 66 which forms the interface port selector 36 to provide an interface port address to both the test signal multiplexer 42 and the successful test multiplexer 44.

Subsequently, the test signal is transmitted from the interface port tester 14 over the interface port test signal path 22 to test signal multiplexer 42 controlled by the address generated by interface port selector 36. Similarly, successful test multiplexer 44 receives the interface port successful test completion signal at the appropriate input 44a selected by the address lines and provides the successful test completion signal over signal path 24 to the interface port tester 14. In this embodiment, level shifter 56 is provided between the interface ports under test and the input multiplexer 44.

Additionally, a port address display 52 including an RCA CD4518 decade counter 66 which drives an RCA CD4511 BCD to 7 segment display driver 68 provides appropriate drive signals to the 7 segment display 70 which provides an indication of the interface port currently under test. Further, display means 50 comprising a buffer 72 and appropriate receive and transmit indicator LED's 74 and 76 respectively provide a visual indication of a transmitted test signal from the interface port tester 14 to interface port under test 18a, 18b and an indication of a received successful test completion signal from the interface port under test 18a, 18b to the interface port tester 14.

In light of the above, it is therefore understood that within the scope of the appended claims, the invention may be practiced otherwise than as specifically described.

What is claimed is:

1. A multi-port tester comprising:
    an interface port tester including at least an initialization input port for receiving an initialization signal, a successful test completion input port for receiving a successful test completion signal, an interface port test signal output port for transmitting an interface port test signal, and a computer electrically connected to said successful test completion output port, said successful test completion input port, and said at least an initialization input port, said computer having at least a display and a keyboard, wherein said display provides an indication of successful interface port test completion in response to said successful test completion signal, and wherein said keyboard includes at least one key adapted to initiate said interface port test signal to be transmitted from said interface port test signal output port;
    a plurality of units under test, each of said plurality of units under test having a test signal input port for receiving said at least one interface port test signal, and a successful test completion output port for providing said successful test completion signal indicating the successful completion of an interface port test; and a multi-port tester interface including an interface port test signal input port coupled to said interface port test signal output port of said interface port tester, an interface port successful test completion output port coupled to said interface port successful test completion input port of said interface port tester, an initialization output port coupled to said initialization input port of said interface port tester, wherein said multi-port tester interface transmits said initialization signal from said initialization output port to said initialization input port of said interface port tester by simulating the depression of said at least one key adapted to initiate said interface port test signal to be transmitted from said interface port test signal output port, a plurality of unit under test interface ports, each of said plurality of unit under test interface ports coupled to said unit under test signal input port on one of said plurality of units under test for transmitting said at least one interface port test signal received from said interface port tester to said coupled one of said plurality of units under test, a plurality of interface port successful test completion inputs, each said interface port successful test completion input coupled to said successful test completion output port of one said plurality of units under test for receiving said interface port successful test completion signal from said coupled one of said plurality of units under test indicating the successful test completion of a test of said coupled on of said plurality of units under test, an interface port test signal display responsive to said interface port test signal for displaying an indication of said interface port test signal transmitted from said interface port tester to said multi-port tester interface, and a successful test completion signal display responsive to a received successful test completion signal for displaying an indication of said successful test completion signal received from said coupled one of said plurality of units under test.

2. A multi-port tester as in claim 1, wherein said multi-port tester interface further comprises:

timing and control logic having an initialization signal output and a control signal output, said initialization signal output for providing said initialization signal to said multi-port tester interface initialization output port, and said control signal output for providing a multi-port tester interface control signal an interface port selector, having a control signal input, coupled to said control signal output of said timing and control logic, said interface port selector having at least one interface selector signal output generating at least one interface port selector signal;

an interface port test signal multiplexer, having a test signal input, coupled to said interface port test signal input port, a plurality of test signal outputs, each of said plurality of test signal outputs coupled to one of said plurality of unit under test interface ports, and an address input, coupled to said interface selector signal output, and said interface port test signal multiplexer responsive to said generated interface port selector signal, for providing said interface port test signal to a selected one of said plurality of units under test; and an interface port successful test completion signal multiplexer, having a plurality of successful test completion signal inputs, each of said plurality of successful test completion signal inputs coupled to of said plurality of interface port successful test completion inputs, a successful test completion signal output coupled to said interface port successful test completion output port, and an address input coupled to said interface selector signal output, and said interface port successful test completion signal multiplexer responsive to said generated at least one interface port selector signal, for providing said interface port successful test completion signal from said selected one of said coupled plurality of units under test to said interface port successful test completion output port of said multi-port tester interface for providing an indication to said interface port tester of successful completion of the test of said unit under test.

3. The multi-port tester of claim 2 wherein said multi-port tester interface further comprises a first signal level shifter, coupled between said plurality of interface port test signal multiplexer test signal outputs and each of said plurality of unit under test interface ports for shifting a voltage level of said interface port test signal provided by said interface port test signal multiplexer from a first voltage level to a second voltage level to be received by said plurality of unit under test interface ports.

4. The multi-port tester of claim 2 wherein said multi-port tester interface further comprises a second signal level shifter, coupled between each of said plurality of interface port successful test completion signal inputs and each of said plurality interface port successful test completion inputs for shifting a voltage level of said successful test completion signal received from said selected one of said plurality of units under test from a first voltage level to a second voltage level.

5. The multi-port tester of claim 2 wherein said at least one interface port selector signal from said interface port selector comprises a plurality of address signals.

6. The multi-port tester of claim 5 wherein said multi-port tester interface further comprises an interface port address display coupled to said interface selector signal output for displaying an indication of the currently selected unit under test.

* * * * *